United States Patent [19]

Stapleton et al.

[11] Patent Number: 5,085,077
[45] Date of Patent: Feb. 4, 1992

[54] ULTRASONIC LIQUID MEASURING DEVICE FOR USE IN STORAGE TANKS CONTAINING LIQUIDS HAVING A NON-UNIFORM VAPOR DENSITY

[75] Inventors: Charles E. Stapleton, Bellevue; Jerauld T. Numata, Renton, both of Wash.

[73] Assignee: Capscan Sales Incorporate, Kirkland, Wash.

[21] Appl. No.: 638,393

[22] Filed: Jan. 7, 1991

[51] Int. Cl.$^5$ .............................. G01F 23/28
[52] U.S. Cl. ........................ 73/290 V; 340/621; 367/908
[58] Field of Search ............. 73/290 V; 340/621

[56] References Cited

U.S. PATENT DOCUMENTS

| | | | |
|---|---|---|---|
| 2,753,542 | 7/1956 | Rod et al. | 340/3 |
| 3,123,797 | 3/1964 | Ehrman | 340/1 |
| 3,184,969 | 5/1965 | Bolton | 73/290 |
| 3,290,490 | 12/1966 | Auer, Jr. | 235/150.24 |
| 3,394,589 | 7/1968 | Tomioka | 73/290 |
| 3,656,134 | 4/1972 | Brown | 340/244 |
| 3,745,829 | 7/1973 | Franchi | 73/290 V |
| 3,834,233 | 9/1974 | Willis et al. | 73/290 V |
| 3,996,798 | 12/1976 | Vander Heyden | 73/195 |
| 4,000,650 | 1/1977 | Snyder | 73/290 V |
| 4,090,407 | 5/1978 | Shuler et al. | 73/290 V |
| 4,121,094 | 10/1978 | DiVito et al. | 235/92 FL |
| 4,130,018 | 12/1978 | Adams et al. | 73/290 V |
| 4,145,914 | 3/1979 | Newman | 73/290 V |
| 4,146,869 | 3/1979 | Snyder | 340/1 L |
| 4,159,646 | 7/1979 | Paulsen et al. | 73/194 A |
| 4,170,144 | 10/1979 | Scott | 73/609 |
| 4,183,007 | 1/1980 | Baird | 367/119 |
| 4,210,967 | 7/1980 | Ingram | 367/34 |
| 4,210,969 | 7/1980 | Massa | 367/908 X |
| 4,221,004 | 9/1980 | Combs et al. | 367/114 |
| 4,229,798 | 10/1980 | Rosie et al. | 364/564 |
| 4,264,788 | 4/1981 | Keidel et al. | 179/110 A |
| 4,305,283 | 12/1981 | Redding | 73/290 V |
| 4,487,065 | 12/1984 | Carlin et al. | 73/290 V |
| 4,513,616 | 4/1985 | Bezard et al. | 73/313 X |
| 4,523,460 | 6/1985 | Strickler et al. | 73/200 |
| 4,535,627 | 8/1985 | Prost et al. | 73/290 B |
| 4,572,253 | 2/1986 | Farmer et al. | 141/95 |
| 4,578,997 | 4/1986 | Soltz | 73/290 V |
| 4,596,144 | 6/1986 | Panton et al. | 73/620 |
| 4,599,892 | 7/1986 | Doshi | 73/49.2 |
| 4,675,660 | 6/1987 | Boscolo | 340/612 |
| 4,675,854 | 6/1987 | Lau | 367/908 |
| 4,700,569 | 10/1987 | Michalski et al. | 73/290 V |
| 4,715,226 | 12/1987 | Dorr | 73/290 V |
| 4,765,186 | 8/1988 | Dieulesaint et al. | 73/290 V |
| 4,770,038 | 9/1988 | Zuckerwar et al. | 73/290 V |
| 4,777,821 | 10/1988 | Gerve | 73/290 V |
| 4,785,664 | 11/1988 | Reebs | 73/290 V |
| 4,787,407 | 11/1988 | Vogel | 137/2 |
| 4,805,453 | 2/1989 | Haynes | 73/292 |
| 4,815,323 | 3/1989 | Ellinger et al. | 73/290 V |
| 4,821,569 | 4/1989 | Soltz | 73/290 V |
| 4,841,770 | 6/1989 | Davies | 73/290 V |
| 4,852,054 | 7/1989 | Mastandrea | 364/509 |
| 4,853,694 | 8/1989 | Tomecek | 340/621 |
| 4,869,287 | 9/1989 | Pepper et al. | 137/391 |
| 4,896,535 | 1/1990 | Duckart et al. | 73/290 V |
| 4,901,245 | 2/1990 | Olson et al. | 364/509 |
| 4,909,080 | 3/1990 | Kikuta et al. | 73/290 V |

FOREIGN PATENT DOCUMENTS

| | | | |
|---|---|---|---|
| 1329765 | 12/1961 | France | 367/908 |
| 765659 | 9/1978 | U.S.S.R. | 73/290 V |

Primary Examiner—Daniel M. Yasich
Attorney, Agent, or Firm—Christensen, O'Connor, Johnson & Kindness

[57] ABSTRACT

An ultrasonic liquid level detector mounted in a fill pipe cap. The ultrasonic detector mounted in a fill pipe cap (10) is used in determining a level and/or the volume of a liquid (5) stored in an underground storage tank (20). The fill pipe cap contains an ultrasonic ranging unit (50) that measures a time, $T_L$, required for an ultrasonic pulse to travel round trip between an ultrasonic transducer/receiver (54) and the surface of the liquid in the tank. A reference reflector (25) disposed within a fill pipe (30) is used in determining a reference time, $T_R$, that is included in a non-linear expression, $e^\alpha \cdot T_L^{\beta_1} \cdot T_R^{\beta_2}$, in order to compute the level of liquid in the storage tank. The terms $e^\alpha$, $\beta_1$, and $\beta_2$ comprise a correction for errors in the round-trip times $T_L$ and $T_R$ caused by a non-uniform vapor density of the liquid along the path traveled by the ultrasonic pulses.

1 Claim, 4 Drawing Sheets

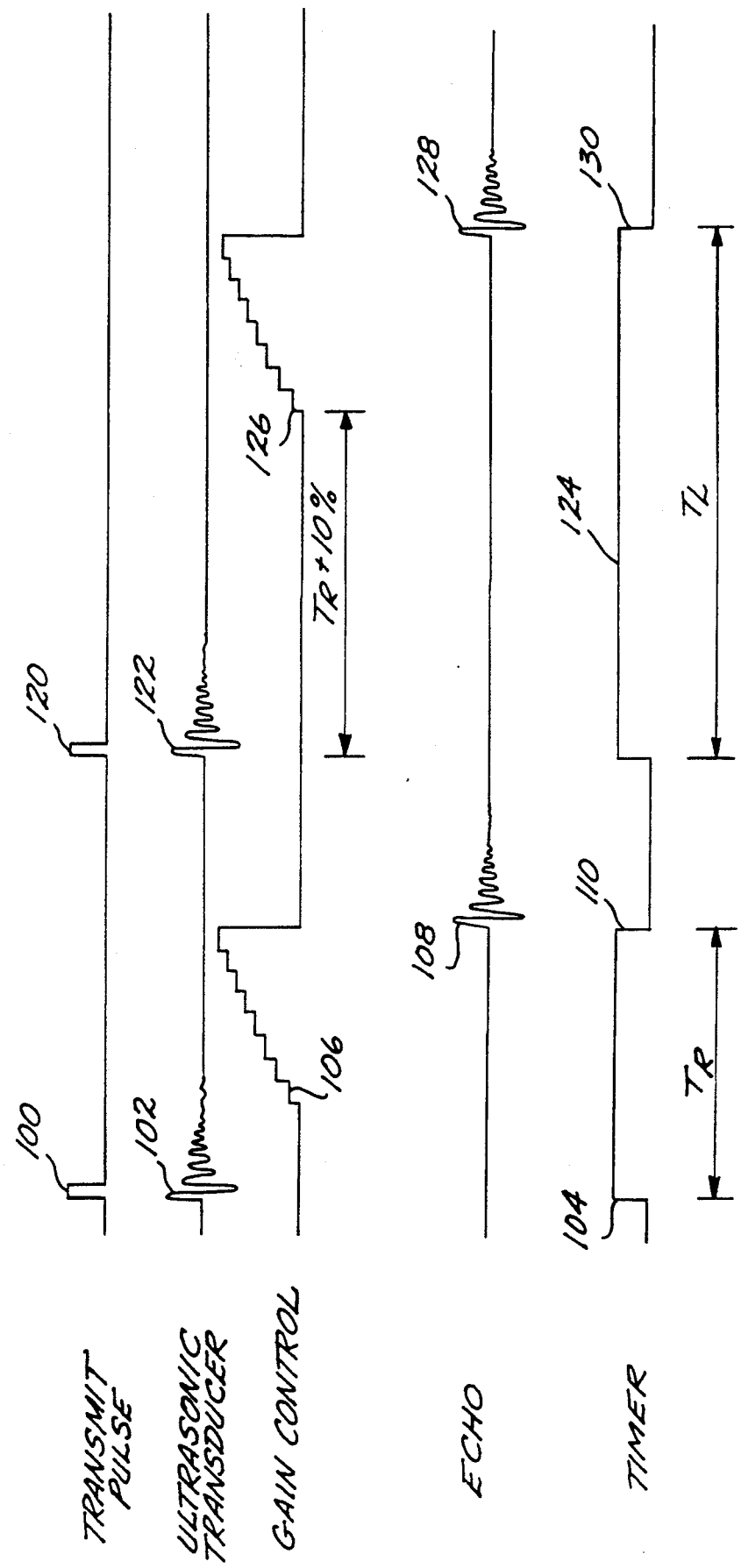

5,085,077

ULTRASONIC LIQUID MEASURING DEVICE FOR USE IN STORAGE TANKS CONTAINING LIQUIDS HAVING A NON-UNIFORM VAPOR DENSITY

BACKGROUND OF THE INVENTION

The present invention relates to ultrasonic measurement apparatus, and in particular, to ultrasonic measurement apparatus for determining the level of a petroleum product stored in an underground tank.

In those industries where large volumes of liquid material are kept in underground storage tanks, it is desirable to be able to easily measure the volume of liquid stored. For example, in the service station industry, current government regulations require that a service station owner record the volume of petroleum products stored underground once every 24 hours. Currently, the method used to determine such volumes comprises a simple dipstick that is inserted into the storage tank. The volume of liquid stored in a tank is computed based on the level of liquid in the tank. The dipstick is calibrated to show the volume of liquid stored in the tank so that the liquid volume can be determined simply by looking at the wet line left on the dipstick as it is raised from the tank. Obviously, such a manual method of volume measurement has its disadvantages. For example, it is difficult to read such a calibrated dipstick in the dark or in the rain. Similarly, intense sunlight can quickly evaporate gasoline, making determination of an accurate wet line position on the dipstick difficult.

There have been numerous attempts to develop an automated volume measuring device; however, such devices have not been proven accurate enough to achieve widespread use in industry. Generally, such devices comprise an ultrasonic transducer and a timing mechanism. The liquid level is determined by the round-trip time it takes an ultrasonic pulse to travel from the transducer to the level of the liquid and back. As with the dipstick method, the volume of liquid stored in the underground tank can be computed if the level of the liquid is known. The problem with such ultrasonic measuring devices is that the level of precision achieved is highly dependent on the velocity of sound in the air above the liquid. Because the velocity of sound in air changes due to the presence of chemical vapor or with changes in temperature, it is necessary to provide a calibration mechanism whereby the speed of sound in the air above the liquid can be compensated.

U.S. Pat. No. 4,210,969, issued to Massa, discloses an ultrasonic liquid level detector that uses a reference reflector located at a precise fixed distance from an ultrasonic transducer. By ratiometrically comparing the time an ultrasonic pulse takes to travel to the reference reflector and back with the time it takes an ultrasonic pulse to travel to the level of a liquid and back, the level of the liquid in the tank can be computed, independent of the velocity of sound in the gaseous medium above the liquid, provided that the velocity of sound remains constant over the traversed distance.

U.S. Pat. No. 4,470,299, issued to Soltz, discloses an ultrasonic level detector that uses a reference reflector placed in a fixed position relative to an ultrasonic transducer to intercept energy from a side signal path and return it to the transducer to produce a reference signal. The reference signal is used in conjunction with a round-trip time it takes an ultrasonic pulse to travel to the liquid level and back to ratiometrically determine the level of liquid in the tank, independent of the velocity of sound in the air above the liquid.

Although the above-mentioned liquid level measuring devices may work well in some environments, they have not proved sufficiently accurate for storage tanks containing liquids having a high vapor pressure. The inventors have discovered that a correction factor is needed for ultrasonic measurements taken in storage tanks that contain petroleum products, to compensate for a non-linear vapor density in the ultrasonic detection path. In storage tanks containing petroleum products such as gasoline or kerosene, the inventors have found that the vapor density changes non-linearly from the top of the fill pipe to the level of the liquid. This changing vapor density causes the velocity of sound to vary accordingly throughout its round trip to the liquid level and back. As a result, it is not possible to accurately ratiometrically determine the level of liquid in a tank containing petroleum products, independent of the velocity of sound, without applying a correction.

SUMMARY OF THE INVENTION

An ultrasonic liquid level measuring device is defined for use in storage tanks containing liquids having a high vapor pressure. The device comprises an ultrasonic transmitting means, disposed above the liquid, for transmitting an ultrasonic signal along a signal path directed at the liquid in the storage tank. A reference reflector is placed at a known distance from the ultrasonic transducer and is operative to return a reference echo pulse to ultrasonic receiving means. The ultrasonic receiving means detect the reference echo pulse and an ultrasonic signal echo reflected from the liquid. Timing means determine a round-trip time, $T_L$, between the transmission of the ultrasonic signal and the receipt of the ultrasonic signal echo reflected from the liquid. Means are provided for computing the level of liquid in the storage tank based on a non-linear equation including the variable $T_L$, and a correction used to modify the variable $T_L$, thereby correcting for an error caused by a non-uniform vapor density of the liquid in the storage tank.

BRIEF DESCRIPTION OF THE DRAWINGS

FIG. 4 shows a timing diagram of the ultrasonic ranging system according to the present invention.

DETAILED DESCRIPTION OF THE PREFERRED EMBODIMENT

Figure 1:
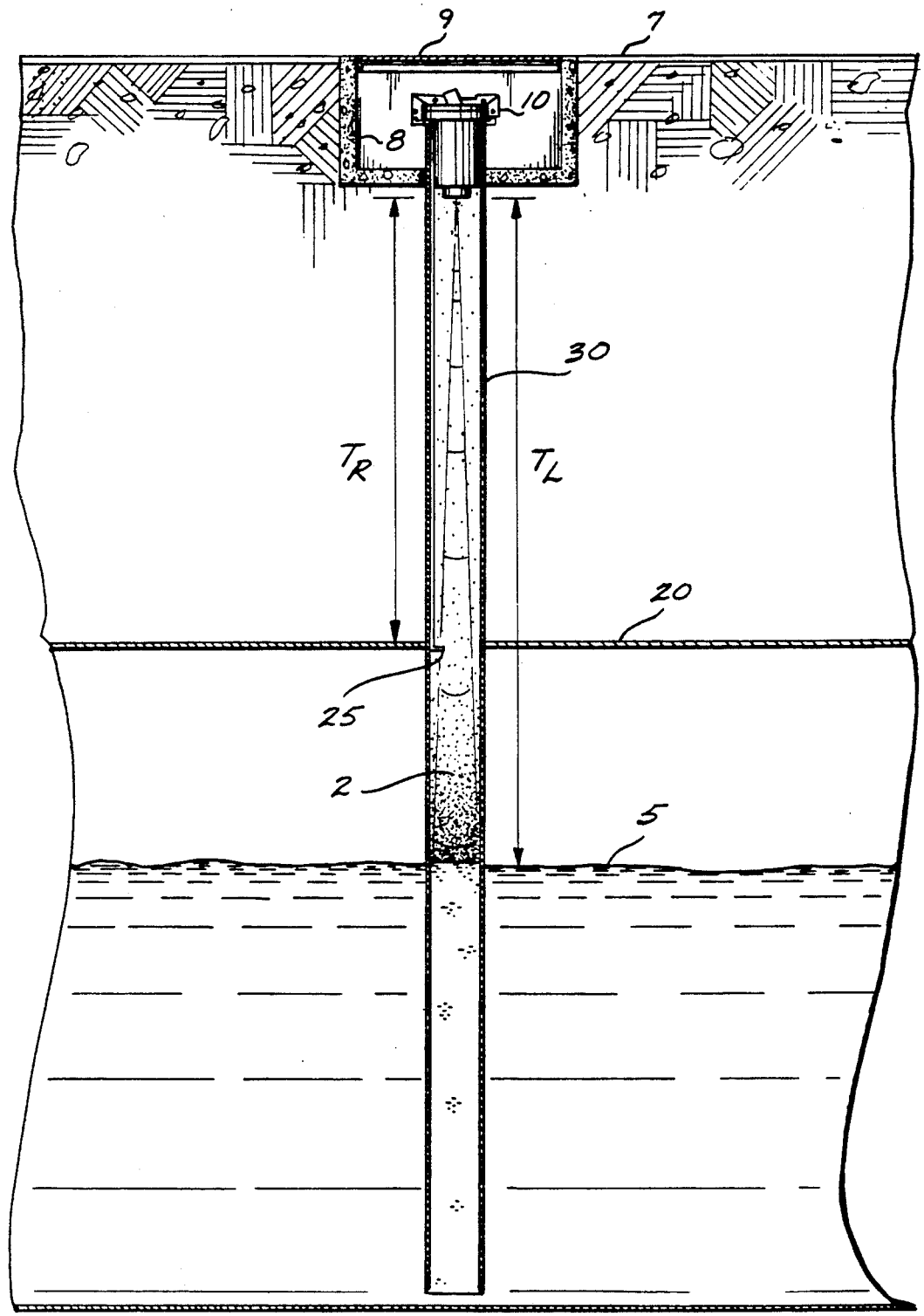
FIG. 1 shows the present invention as used to measure liquid level in a fill pipe of a storage tank.

FIG. 1 shows a fill pipe cap 10 containing an ultrasonic ranging unit 50, according to the present invention, in place within a storage tank 20 that contains a liquid 5. Fill pipe cap 10 is secured within a fill pipe 30 that extends from a position near the bottom of storage tank 20 to an enclosure 8 near a surface of ground 7. By removing a cover 9, an operator can determine the volume of liquid in the storage tank by activating an ultrasonic ranging system disposed in fill pipe cap 10. This is a distinct improvement over the prior art method of determining the volume of liquid that involves the use of a calibrated dipstick that is lowered from surface 7 into fill pipe 30.

The inventors have discovered that in storage tanks containing a liquid 5 that tends to produce copious amounts of vapor at typical ambient temperatures due to a relatively high vapor pressure, prior art ultrasonic ranging devices were inadequate to achieve a level of accuracy required by industry. It has been discovered that the density of some liquid vapors changes non-linearly with distance above the liquid in the tank. In order to compensate for this non-uniform vapor density, a reference reflector 25 is placed within fill pipe 30 to calculate a correction factor needed to provide the required accuracy. Ultrasonic ranging unit 50 operates to measure two time intervals $T_R$ and $T_L$ used in the calculation of the level of liquid within storage tank 20 and the correction factor. Once the level of liquid 5 with storage tank 20 is known, it is a simple calculation to compute the volume of liquid stored, given the size and shape of storage tank 20.

Figure 2:
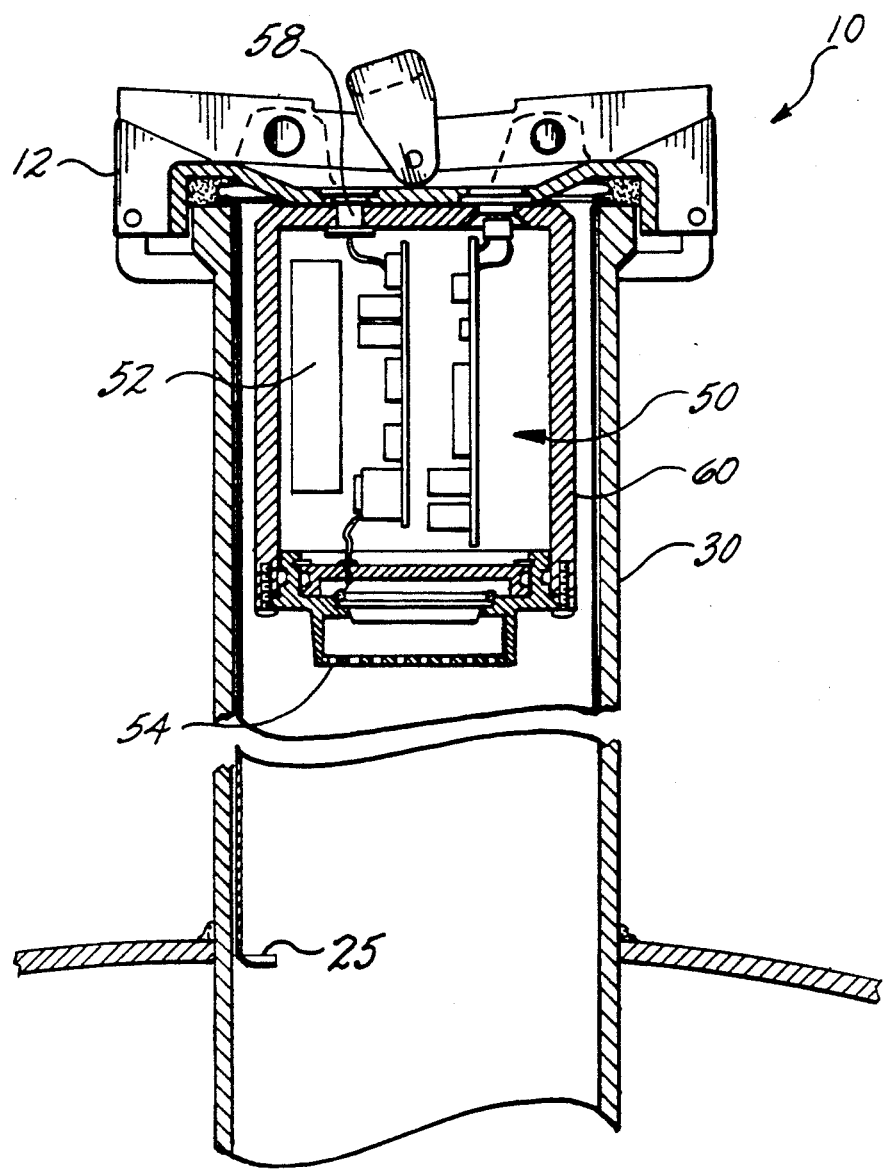
FIG. 2 shows a cross-sectional view of the ultrasonic measuring device comprising the present invention.

FIG. 2 shows a cross-sectional view of fill pipe cap 10 housing ultrasonic ranging unit 50 according to the present invention. Fill pipe cap 10 comprises a locking mechanism 12 that secures fill pipe cap 10 within fill pipe 30. Locking mechanism 12 is well known in the art and need not be discussed further. Mounted under fill pipe cap 10 is an ultrasonic ranging unit 50, contained within a sealed housing 60. Housing 60 is formed of a material capable of withstanding harsh chemicals such as petroleum vapors. Ultrasonic ranging unit 50 is powered by a long-life battery 52, which drives an ultrasonic transducer/receiver 54, associated driving electronics 56, and a display 58.

Figure 3:
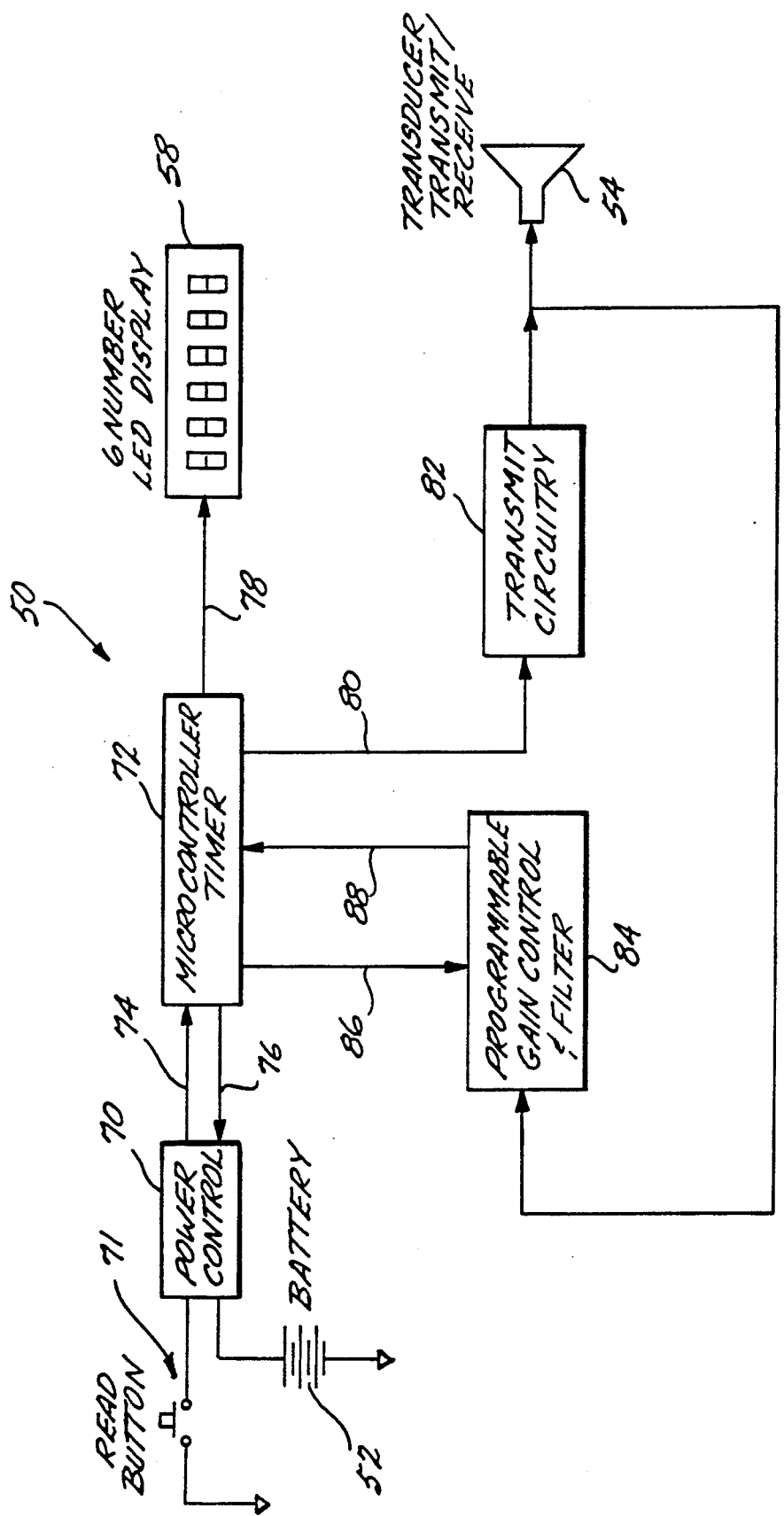
FIG. 3 shows a schematic block diagram of the ultrasonic measuring device.

FIG. 3 shows a schematic block diagram of the control electronics that drive ultrasonic transducer/receiver 54 used in ultrasonic ranging unit 50. Battery 52 is connected to a power control unit 70, which operates to disconnect battery 52 when ultrasonic ranging unit 50 is not in use. A read button 71 pushed by an operator causes power control unit 70 to apply power to ultrasonic ranging unit 50 for a defined interval. Connected to power control unit 70 via leads 74 and 76 is a microcontroller/timer 72. Microcontroller/timer 72 receives power from power control unit 70 via lead 74 and can turn off power control unit 70 via a signal conveyed over lead 76. Connected to microcontroller/timer 72 via leads 78 is a six-digit LED display 68. LED display 68 provides a visual indication of the depth and/or volume of liquid stored in the underground storage tank. Microcontroller/timer 72 generates transmit signals conveyed via a lead 80 to control transmit circuitry 82, which in turn is used to drive ultrasonic transducer/receiver 54. In the preferred embodiment, the transducer/receiver comprises a POLAROID® ultrasonic transducer. However, it is understood that other types of ultrasonic transducers will work equally well in this application.

Microcontroller/timer 72 controls a programmable gain control (PGC) and filter 84 via signals carried on a lead 86. PGC and filter 84 is an integrated circuit, TL852, available from Texas Instruments, and is configured in a way suggested in the manufacturer's data book. Microcontroller/timer 72 receives a signal representative of echo pulses received by ultrasonic transducer/receiver 54 through an output lead 88 from PGC and filter 84.

FIG. 4 shows the timing diagram of the ultrasonic signals transmitted and received by ultrasonic transducer/receiver 54. A trigger pulse 100 set by microcontroller/timer 72 is transmitted via lead 80 to transmit circuitry 82, which in turn causes ultrasonic transducer/receiver 54 to send an ultrasonic pulse 102 directed at the surface of the liquid. At the same time as trigger pulse 100 occurs, a timing signal 104 is started within an internal timer (not shown) in microcontroller/timer 72. After waiting a sufficient time 106 to ensure ultrasonic transducer/receiver 54 has stopped ringing, the gain of PGC and filter 84 is increased stepwise until a reference echo 108 is received by ultrasonic transducer/receiver 54. Received reference echo 108 causes microcontroller/timer 72 to stop the timing signal at a time 110. Therefore, the time it takes ultrasonic pulse 102 to reach reference reflector 25 and return is equal to the time between times 104 and 110, designated as $T_R$.

A second trigger pulse 120 is set by microcontroller/timer 72, causing a second ultrasonic pulse 122 to be transmitted by ultrasonic transducer/receiver 54. At the same time as trigger pulse 120 is set, the timer (not shown) within microcontroller/timer 72 begins timing an interval 124. Microcontroller/timer 72 blanks received impulses for a time equal to $T_R$ plus 10% so that impulses from the reference reflector are ignored. Beginning at time 126, the gain of PGC and filter 84 is increased stepwise until a liquid echo pulse 128 is detected by ultrasonic transducer/receiver 54. At a time 130 when liquid echo pulse 128 is detected, the timer (not shown) within microcontroller/timer 72 is stopped. A time, $T_L$, therefore, is defined as the time required for an ultrasonic pulse from the transducer to travel to the surface of the liquid and back, and this time is equal to interval 124.

To compute the level of liquid within storage tank 20, microcontroller/timer 72 uses the equation:

$$\text{Liquid level} = e^\alpha \cdot T_L{}^{\beta_1} \cdot T_R{}^{\beta_2} \tag{1}$$

The constants $e^\alpha$, $\beta_1$, and $\beta_2$ of Equation 1 are applied to correct for variations in the speed of sound in the air above the liquid due to a non-uniform vapor density. The constants are determined empirically depending on the type and formulation of the product stored within the storage tank. For example, the constants can vary according to the different grades of gasoline stored in the tank. Below is a Table of the $\alpha$, $\beta_1$, $\beta_2$ constants used for unleaded, regular, super unleaded, and warm weather unleaded (an unleaded gasoline as modified by the manufacturer for sale in warmer climates) gasolines. The constants were computed using a reference reflector placed 36" below the ultrasonic transducer. However, the constants will vary if a reference reflector is placed at a different distance away from the ultrasonic transducer.

TABLE

| Type of gasoline | $\alpha$ | $\beta_1$ | $\beta_2$ |
|---|---|---|---|
| Unleaded | 7.123172 | 0.8455155 | −0.6932026 |
| Regular | 5.547979 | 0.7776105 | −0.4212075 |
| Super | 5.838269 | 0.8442458 | −0.5311595 |
| Warm Weather Unleaded | 4.830066 | 0.9410260 | −0.5166730 |

Again, it is realized that such constants may vary depending on chemical composition of the liquid being measured. Variation in the environmental ambient conditions where the ultrasonic ranging unit is used are taken into account by the measurement of $T_R$.

Appropriate values of $\alpha$, $\beta_1$, and $\beta_2$ can be determined by comparing the actual level of a specific liquid stored in a tank, as determined by manual measurement, with the round-trip times $T_R$ and $T_L$, as determined by the ultrasonic ranging unit, at a plurality of different liquid levels. A curve-fitting computer program can then be used to find the best values of $\alpha$, $\beta_1$, and $\beta_2$ to use in Equation 1 for that liquid.

Once the level of liquid 5 has been calculated, microcontroller/timer 72 converts the level of liquid to a corresponding volume measurement using a standard conversion formula or a look-up table stored in a read only memory (ROM) (not shown) within microcontroller/timer 72. The volume and/or liquid level depth are displayed to the operator on display 58. As previously stated, the inventors have discovered that the non-uniform nature of vapor 2 within fill pipe 30 renders a simple ratiometric comparison of $T_L$ and $T_R$ inadequate to accurately determine the level of liquid in storage tank 20. Therefore, the correction for non-uniform vapor density provided by Equation 1 is used in order to improve the accuracy.

Although the present invention has been disclosed with respect to the preferred embodiment, those skilled in the art will realize that changes may be made in the form and substance without departing from the spirit and scope of the invention. Therefore, the scope is to be only determined from the following claims.

The embodiments of the invention in which an exclusive property or privilege is claimed are defined as follows:

1. A liquid level detector mounted in a petroleum tank cap, for use in determining a level of a petroleum liquid product within a storage tank comprising:

means for locking the petroleum tank cap to a fill pipe extending into the storage tank;

ultrasonic transmitting means for transmitting an ultrasonic signal along a signal path directed at the petroleum liquid product stored in the tank;

ultrasonic receiving means for receiving an ultrasonic signal reflected from the liquid stored in the tank;

a reference reflector placed in the signal path, the reference reflector operating to reflect a reference signal back to the ultrasonic receiving means;

timing means for determining a variable, $T_R$, representative of a time required for the ultrasonic signal to travel to the reference reflector and back, and a variable, $T_L$, representative of a time for the ultrasonic signal to travel to a surface of the petroleum liquid product and back; and a processor for computing the level of the petroleum liquid product within the storage tank using an expression, $e^{\alpha} \cdot T_L^{\beta_1} \cdot T_R^{\beta_2}$, which includes a compensation for a non-uniform vapor density of the petroleum liquid product, wherein e is approximately equal to 2.7183 and $\alpha$, $\beta_1$, and $\beta_2$ are empirically determined constants for the petroleum liquid product.

* * * * *